L. BENNETT.
RIVET HEAD DRILL.
APPLICATION FILED SEPT. 24, 1910.

1,023,002.

Patented Apr. 9, 1912.

Witnesses
J. L. Wright,

Inventor
Lincoln Bennett,
By Victor J. Evans,
Attorney

COLUMBIA PLANOGRAPH CO., WASHINGTON, D. C.

UNITED STATES PATENT OFFICE.

LINCOLN BENNETT, OF RENOVO, PENNSYLVANIA, ASSIGNOR TO ARTHUR P. PFOUTZ, OF RENOVO, PENNSYLVANIA.

RIVET-HEAD DRILL.

1,023,002.      Specification of Letters Patent.      Patented Apr. 9, 1912.

Application filed September 24, 1910. Serial No. 583,615.

*To all whom it may concern:*

Be it known that I, LINCOLN BENNETT, a citizen of the United States of America, residing at Renovo, in the county of Clinton and State of Pennsylvania, have invented new and useful Improvements in Rivet-Head Drills, of which the following is a specification.

This invention relates to rivet head drills, and has for an object to provide a machine of this character which is designed for attachment to any air motor or the equivalent thereof for its source of power, and which is constructed with a view of allowing that portion of the head in direct line with the shank of the rivet to remain intact, allowing it to be reheaded if desired.

Another object of the machine is to provide a most efficient cutter and to construct it with a view of preventing it from gouging or destroying any part of the sheet to which the rivet is applied and to provide a stop element so as to limit the movement of the cutter toward the work.

A still further object of the invention is to construct the machine so that cutters of the required size, according to the work to be operated upon may be interchangeably associated with the support of the machine.

Another object is to provide a novel form of centering element designed to engage the central portion of the rivet head and to be associated therewith so that when pressure is applied to the machine the rivet will be held against any possible movement and the cutter will be held properly associated with the rivet head.

Figure 1:
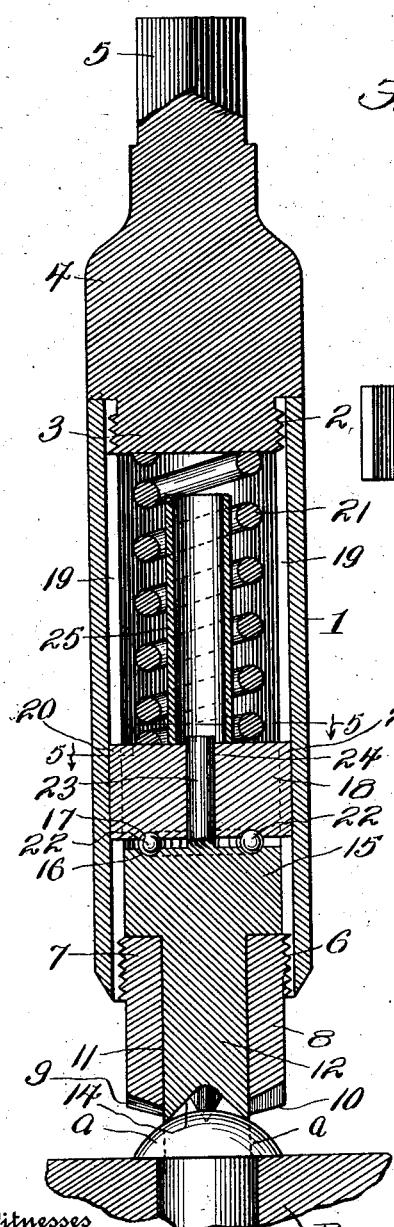
Figure 6:
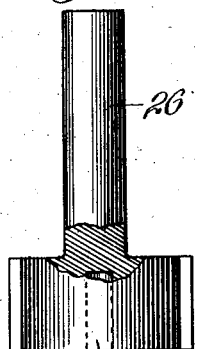
Figure 2:
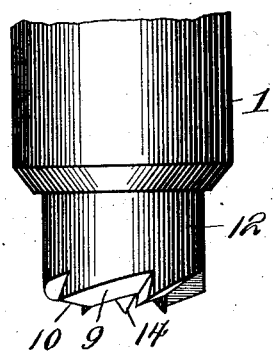
Figure 3:
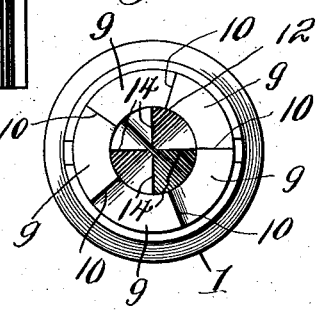
Figure 4:
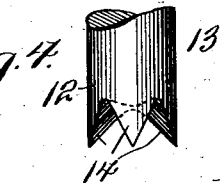
Figure 5:
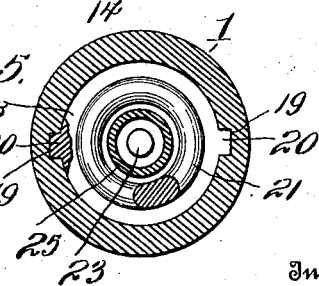

In the drawing, forming a portion of this specification and in which like numerals of reference indicate similar parts in the several views:—Figure 1 is a vertical section through my improved rivet head drill showing the same operatively applied to the head of the rivet. Fig. 2 is a side elevation of a portion of the support and the cutter. Fig. 3 is an end view of the cutter. Fig. 4 is a fragmentary view of the centering element. Fig. 5 is a section taken on the line 5—5 of Fig. 1. Fig. 6 is an elevation of a slightly modified form of stop.

The invention is directed particularly to the cutter and to the support therefor and no motive power for driving these elements will be described or shown herein as it is obvious that any suitable source of motive power may be utilized for driving the machine. I employ a support 1 which is hollow throughout. At one end the support is threaded interiorly, as at 2, to receive the exteriorly threaded plug end 3 of a cap 4. This cap is formed with a squared head 5 to fit the socket of the driving motor, (not shown). At the opposite end, the support 1 is threaded interiorly as at 6, to fit the corresponding exteriorly threaded end 7 of the cutter 8.

In practice, a series of cutters of different size will be used in connection with the machine and constructed for the interchangeable association therewith, the object being to provide means whereby rivet heads of different sizes can be cut. The cutter 8 is formed with an annular series of substantially ratchet-like cutting teeth 9, the cutting surfaces 10 of each group being inclined downwardly toward the longitudinal axis of the machine for a purpose to be hereinafter explained.

The cutter is hollow and in the bore 11 thereof fits the shank 12 of the centering element 13. The head-engaging end of the centering element is formed with an annular series of substantially V-like teeth 14 whose smaller ends extend beyond the cutting surfaces of the cutter 8. The centering element is formed at its inner end with an enlarged head 15 in which is formed one groove 16 of a ball-race, the other groove 17 of the race being formed in a guide member 18 inside of the support 1.

The support 1 is formed throughout on its interior surface with longitudinal diametrically opposite grooves 19 in which the ribs 20 of the member 18 are fitted, the purpose of this construction being to hold the member 18 and to cause it to rotate with the support. A strong helical spring 21 is mounted in the support 1 between the cap 4 and the member 18, the function of the spring being to exert its tension to hold the centering element 13 normally extended beyond the cutter 8. Antifriction bodies 22 are mounted in the raceway formed by the grooves 16 and 17. The head 15 is formed with a stem 23 which extends into a correspondingly formed passage 24 in the member 18. A removable stop 25 extends through the spring. This stop is designed to engage the cap 4 when pressure is applied to the machine so as to limit the inward movement of the centering tool.

In operation of the machine, the centering element 13 is applied to the central portion of the head of the rivet as shown in Fig. 1 of the drawing. The required pressure is then applied to the machine and the latter is rotated to cause the cutting surfaces of the cutter 8 to cut that portion of the rivet outwardly of the dotted line *a* in Fig. 1 of the drawing, leaving the central portion of the head in a longitudinal axis with the shank of the rivet intact. The remaining head portion of the rivet will be less in diameter to that of the shank so as to insure passage of the rivet through the opening in the sheet B. The distance between the lowermost point of the cutting surface of the cutter 8 and the sheet or surface against which the machine is used is equal to the distance between the stop 25 and the inner surface of the cap 4. This limits the movement of the support on the shank of the centering element and prevents the cutter of the machine from working into the sheet or work. Incident to the construction of the cutting surfaces 10 of the teeth 9 the lowermost point of the cutting surface of the shank on removal of the head of the rivet will cut into the shank of the rivet and not into the sheet B. This prevents mutilation or weakening of the sheet during its operation.

In the form of my invention illustrated in Fig. 6, the stop 26 is an integral part of the member 18'. In the preferred form of my invention the stop 25 is removable from the member 18 so that on changing the cutter according to the character of the work a corresponding stop may be associated with the machine to limit the movement of the cutter toward the work.

I claim:

1. A rivet head cutting machine comprising a rotatable casing and a cap therefor, a centering element mounted in the casing, a cutter carried by the casing, said cutter and casing being rotatable and slidable relatively to the centering element, a guide member slidably mounted in the casing and engaging the head of the centering element, anti-friction bodies mounted intermediate the guide member and the centering element, and means intermediate the said guide member and the cap for limiting the movement of the cutter toward its work.

2. A rivet head cutting machine comprising a rotatable casing formed on its inner surface with longitudinal diametrically opposite grooves, a centering element mounted in the casing, a cutter carried by the casing, said cutter and casing being rotatable and slidable relatively to said centering element, a guide member, ribs formed on said guide member and adapted to enter said grooves, said guide member being slidably mounted in the casing and adapted to engage the head of the centering element, anti-friction bodies intermediate the centering element and the said guide member, and means interconnecting said guide member and centering element.

3. A rivet head cutting machine comprising a rotatable casing, a centering element mounted therein, a cutter carried by said casing and surrounding said centering element, said casing and cutter being rotatable and slidable on the centering element, a guide member slidably mounted in the casing and adapted to engage the head of the centering element, anti-friction bodies intermediate said guide members and centering element, and means mounted intermediate the said guide member and the head of the casing, said means adapted to limit the movement of the cutter relative to the centering element.

In testimony whereof I affix my signature in presence of two witnesses.

LINCOLN BENNETT.

Witnesses:
 JOSEPH SHEERIN,
 BERTIE B. SHAFFER.

Copies of this patent may be obtained for five cents each, by addressing the "Commissioner of Patents, Washington, D. C."